(12) United States Patent
Bettink et al.

(10) Patent No.: US 8,340,090 B1
(45) Date of Patent: Dec. 25, 2012

(54) INTERCONNECTING FORWARDING CONTEXTS USING U-TURN PORTS

(75) Inventors: John H. W. Bettink, San Jose, CA (US); David Delano Ward, Somerset, WI (US); Pawan Uberoy, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1020 days.

(21) Appl. No.: 11/715,759

(22) Filed: Mar. 8, 2007

(51) Int. Cl.
*H04L 12/56* (2006.01)

(52) U.S. Cl. ........ 370/389; 370/230; 370/235; 370/392; 370/395.31; 370/400; 709/232; 709/238; 709/243; 709/244; 711/211; 379/272

(58) Field of Classification Search ............... 370/230, 370/235, 389, 392, 395.31, 400, 401; 709/232, 709/238, 243, 244; 711/211; 379/272
See application file for complete search history.

(56) References Cited

U.S. PATENT DOCUMENTS

| | | | |
|---|---|---|---|
| 6,098,172 A | 8/2000 | Coss et al. | |
| 6,219,706 B1 | 4/2001 | Fan et al. | |
| 6,505,254 B1 | 1/2003 | Johnson et al. | |
| 6,854,063 B1 | 2/2005 | Qu et al. | |
| 7,000,248 B2 | 2/2006 | Mizukoshi | |
| 7,007,169 B2 | 2/2006 | Lingafelt et al. | |
| 7,131,140 B1 | 10/2006 | O'Rourke et al. | |
| 7,188,363 B1 | 3/2007 | Boutros et al. | |
| 7,225,263 B1 | 5/2007 | Clymer et al. | |
| 7,308,716 B2 | 12/2007 | Danford et al. | |
| 7,318,097 B2 | 1/2008 | Bernoth | |
| 7,370,353 B2 | 5/2008 | Yang | |
| 2004/0013120 A1 * | 1/2004 | Shen | 370/395.31 |
| 2004/0049701 A1 | 3/2004 | Le Pennec et al. | |
| 2004/0230860 A1 * | 11/2004 | Krakirian et al. | 714/4 |
| 2005/0114648 A1 | 5/2005 | Akundi et al. | |
| 2006/0005236 A1 | 1/2006 | Wesinger, Jr. et al. | |
| 2006/0059550 A1 | 3/2006 | Kausik | |
| 2006/0203820 A1 * | 9/2006 | Coluccio | 370/392 |
| 2007/0110060 A1 * | 5/2007 | Miki et al. | 370/389 |
| 2007/0261110 A1 | 11/2007 | Oz et al. | |

* cited by examiner

*Primary Examiner* — Hoon J Chung
(74) *Attorney, Agent, or Firm* — The Law Office of Kirk D. Williams

(57) ABSTRACT

Disclosed are, inter alia, methods, apparatus, computer-readable media, mechanisms, and means for interconnecting forwarding contexts using U-turn ports. A U-turn port typically comprises an egress port and an ingress port such that packets placed in the egress port are automatically forwarded to the ingress port. Other forwarding contexts are able to communicate packets to a next-destination forwarding context by sending these packets to the U-turn port of the next-destination forwarding context.

23 Claims, 8 Drawing Sheets

US 8,340,090 B1

INTERCONNECTING FORWARDING CONTEXTS USING U-TURN PORTS

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

Packet switching devices have evolved from devices where each device represents a single router or bridge, to devices that support multiple "forwarding contexts." As used herein, forwarding contexts include, but are not limited, to virtual routers, logical routers, and/or virtual private networks. Each forwarding context maintains or is associated with packet forwarding information relevant to itself. For example, two logical routers might be housed in the same physical device, but these different forwarding contexts will maintain separate routing tables and forwarding information based for use in processing and forwarding packets.

Of course, this processing of packets in one forwarding context may determine that certain packets should be communicated to a different forwarding context. In the past, this has meant that the packet should be sent to a different packet switching device. However, today, it is possible that these different forwarding contexts are housed in a same physical packet switch, such as in different logical or virtual routers of a single physical router.

One prior approach used to communicate packets between two forwarding contexts, especially between logical routers (i.e., where each line card only belongs to a single forwarding context) uses physical cables to connect different forwarding contexts with each other, which requires a technician to correctly connect a physical cables for each pair of forwarding contexts.

Another prior approach used in a physical router avoids the overhead of the previously described prior approach by combining forwarding information belonging to multiple virtual forwarding contexts, which effectively blurs the physical structure of the physical router. For example, by determining a forwarding information base using information from multiple forwarding contexts, a packet to be forwarded from an ingress port of the physical router directly to an egress port of the physical router even if the egress port is associated with a different forwarding context than the ingress port.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1A:
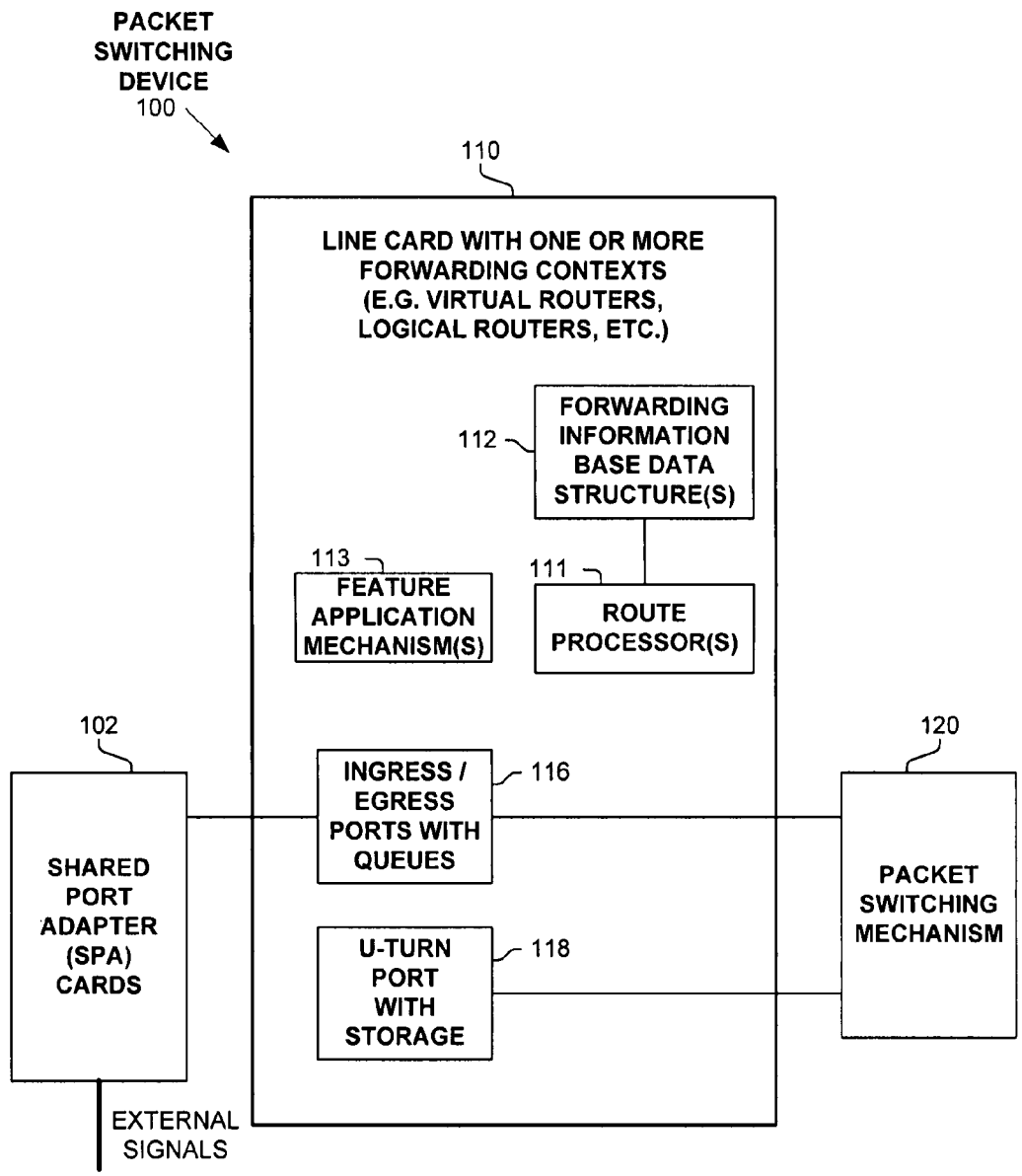
FIG. 1A illustrates an example configuration used in one embodiment.

Disclosed are, inter alia, methods, apparatus, computer-readable media, mechanisms, and means for interconnecting forwarding contexts using U-turn ports, which refers to automatic paths internal to a packet switching device between the egress portion of one forwarding context to the ingress portion of another forwarding context such that additional lookup and/or other packet processing/forwarding operation(s) can be performed in a different forwarding context.

One embodiment includes a packet switching device, which comprises: a first line card, second line card, and a switching mechanism configured to communicate packets among the line cards of the packet switching device. The first line card, including a first ingress port and a first egress port, is associated with a first forwarding context configured to identify forwarding information for packets based on a first forwarding information base stored on the first line card. The second line card is associated with a second forwarding context and is configured to identify forwarding information for packets based on a second forwarding information base. The second line card also includes a U-turn port comprising a second ingress port and a second egress port; wherein packets received on the second egress port are configured to be automatically forwarded to the second ingress port unless they are dropped from the second egress port. Additionally, the first line card is configured to forward packets identified to be sent to the second forwarding context or second line card based on the first forwarding information base from the first ingress port over the switching mechanism to the second egress port of the U-turn port via the switching mechanism without traversing an ingress port of the second line card.

One embodiment includes a packet switching device, which comprises: a first forwarding context, a second forwarding context, and a switching mechanism configured to communicate packets among the forwarding contexts. The first forwarding context, associated with a first ingress port and a first egress port for respectively receiving packets and transmitting packets, is configured to identify forwarding information for packets based on a first forwarding information base. The second forwarding context, associated with a U-turn port comprising a second ingress port and a second egress port, is configured to identify forwarding information for packets based on a second forwarding information base. The packet switching device is configured such that packets received on the second egress port are automatically forwarded to the second ingress port unless they are dropped from the second egress port. The first forwarding context is configured to forward packets identified to be sent to the second forwarding context based on the first forwarding information base from the first ingress port over the switching mechanism to the second egress port of the U-turn port via the switching mechanism without traversing an ingress port of the second forwarding context.

One embodiment includes a packet switching device, which comprises: a first forwarding context, a second forwarding context, and a switching mechanism configured to communicate packets among the forwarding contexts. The first forwarding context, associated with a first ingress port and a first egress port for respectively receiving packets and transmitting packets, is configured to identify forwarding information for packets based on a first forwarding information base. The first forwarding context also includes a first U-turn port comprising a particular ingress port and a particular egress port; wherein the packet switching device is configured to automatically forward packets received on the particular egress port to the particular ingress port unless they are dropped from the particular egress port. The second forwarding context, associated with a U-turn port comprising a second ingress port and a second egress port, is configured to identify forwarding information for packets based on a second forwarding information base. The packet switching device is configured such that packets received on the second egress port are automatically forwarded to the second ingress port unless they are dropped from the second egress port. The first forwarding context is configured to forward packets identified to be sent to the second forwarding context based on the first forwarding information base from the first ingress port over the switching mechanism to the second egress port of the U-turn port via the switching mechanism without traversing an ingress port of the second forwarding context. The first forwarding context is also configured to forward packets identified to be sent to the second forwarding context based on the first forwarding information base from the particular ingress port of the first U-turn over the switching mechanism to the second egress port of the U-turn port via the switching mechanism without traversing an ingress port of the second forwarding context. In one embodiment, the first forwarding context is configured to send packets received on the first ingress port and identified as being associated with a tunnel to the particular egress port of the first U-turn port. In one embodiment, the first and the second forwarding contexts are associated with different virtual routers.

2. Description

Disclosed are, inter alia, methods, apparatus, computer-readable media, mechanisms, and means for interconnecting forwarding contexts using U-turn ports, which refers to automatic paths internal to a packet switching device between the egress portion of one forwarding context to the ingress portion of another forwarding context such that additional lookup and/or other packet processing/forwarding operation(s) can be performed in a different forwarding context.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields or data of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or reference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc.) than that of an "admitted" packet. The term "interface" of a networked device refers to a physical interface, a logical interface (e.g., a portion of a physical interface or sometimes referred to in industry as a sub-interface—for example, such as, but not limited to a particular VLAN associated with a network interface), and/or a virtual interface (e.g., traffic grouped together based on some characteristic—for example, such as, but not limited to, a tunnel interface). The term "port" is used generically and expansively herein, which is consistent with term of art usage in the packet switching art (in contrast to the limited definition of being an entrance or exit to a data network or a connection point to a peripheral device). Features are typically applied to packets at ports. U-turn ports refers to automatic paths internal to a packet switching device between the egress portion of one forwarding context to the ingress portion of another forwarding context such that additional lookup and/or other packet processing/forwarding operation(s) can be performed in a different forwarding context. A U-turn port providing a path from a first forwarding context to a second forwarding context will have an egress port of the U-turn port associated with the first forwarding context and an ingress port associated with the second forwarding context.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type. The term "packet switching device" is an extensible term describing a device that performs packet switching, such as, but not limited to, a router, bridge, packet switch, computer or other processing mechanism that routes or moves packets between ports/interfaces. The term "packet switching mechanism" is an extensible term describing a device for switching packets, including, but not limited to individual items or combinations of switch fabric, crossbar, bus, time-division and/or space-division switching device, etc. The term "egress port" refers to a port of an interface and/or line card which when connected to an external device (possibly via a shared port adapter) would be used to send packets out of the packet switch; while the term "ingress port" refers to a port of an interface and/or line card which when connected to an external device (possibly via a shared port adapter) would be used to receive packets into of the packet switch.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-readable media, mechanisms, and means for interconnecting forwarding contexts using U-turn ports, which refers to automatic paths internal to a packet switching device between the egress portion of one forwarding context to the ingress portion of another forwarding context such that additional lookup and/or other packet processing/forwarding operation(s) can be performed in a different forwarding context.

One embodiment includes a packet switching device, which comprises: a first line card, second line card, and a switching mechanism configured to communicate packets among the line cards of the packet switching device. The first line card, including a first ingress port and a first egress port, is associated with a first forwarding context configured to identify forwarding information for packets based on a first forwarding information base stored on the first line card. The second line card is associated with a second forwarding context and is configured to identify forwarding information for packets based on a second forwarding information base. The second line card also includes a U-turn port comprising a second ingress port and a second egress port; wherein packets received on the second egress port are configured to be automatically forwarded to the second ingress port unless they are dropped from the second egress port. Additionally, the first line card is configured to forward packets identified to be sent to the second forwarding context or second line card based on the first forwarding information base from the first ingress port over the switching mechanism to the second egress port of the U-turn port via the switching mechanism without traversing an ingress port of the second line card.

One embodiment includes a third line card, including a third ingress port and a third egress port, which is associated with a third forwarding context and is configured to identify forwarding information for packets based on a third forwarding information base stored on the third line card. The third line card is also configured to forward packets identified to be sent to the second forwarding context or second line card based on the third forwarding information base from the third ingress port over the switching mechanism to the second egress port of the U-turn port via the switching mechanism without traversing an ingress port of the second line card. In one embodiment, all packets forwarded from the first forwarding context on the first line card to the second forwarding context on the second line card and from the third forwarding context on the third line card to the second forwarding context on the second line card are forwarded through the U-turn port. In one embodiment, the first, the second and the third forwarding contexts are associated with different logical routers. In one embodiment, the second line card is configured to process said packets received on the U-turn port according to the configuration of the second forwarding context.

In one embodiment, all packets forwarded from the first forwarding context on the first line card to the second forwarding context on the second line card are forwarded through the U-turn port. In one embodiment, the first line card includes a third forwarding context configured to identify forwarding information for packets based on a third forwarding information base stored on the first line card, the first line card including a third ingress port and a third egress port; wherein the first line card is configured to forward packets identified to be sent to the second forwarding context or second line card based on the third forwarding information base from the third ingress port over the switching mechanism to the second egress port of the U-turn port via the switching mechanism without traversing an ingress port of the second line card. In one embodiment, all packets forwarded from the first and the third forwarding contexts on the first line card to the second forwarding context on the second line card are forwarded through the U-turn port. In one embodiment, the second line card is configured to process said packets received on the U-turn port according to the configuration of the second forwarding context.

In one embodiment, the second line card is configured to process said packets received on the U-turn port according to the configuration of the second forwarding context. In one embodiment, the first and the second forwarding contexts are associated with different virtual routers. In one embodiment, the first and the second forwarding contexts are associated with different logical routers. In one embodiment, the second egress port is configured such that no packets are dropped by the second egress port.

One embodiment includes a packet switching device, which comprises: a first forwarding context, a second forwarding context, and a switching mechanism configured to communicate packets among the forwarding contexts. The first forwarding context, associated with a first ingress port and a first egress port for respectively receiving packets and transmitting packets, is configured to identify forwarding information for packets based on a first forwarding information base. The second forwarding context, associated with a U-turn port comprising a second ingress port and a second egress port, is configured to identify forwarding information for packets based on a second forwarding information base. The packet switching device is configured such that packets received on the second egress port are automatically forwarded to the second ingress port unless they are dropped from the second egress port. The first forwarding context is configured to forward packets identified to be sent to the second forwarding context based on the first forwarding information base from the first ingress port over the switching mechanism to the second egress port of the U-turn port via the switching mechanism without traversing an ingress port of the second forwarding context.

In one embodiment, all packets forwarded from the first forwarding context on the first line card to the second forwarding context on the second line card are forwarded through the U-turn port. In one embodiment, the first and the second forwarding contexts are associated with different virtual routers. In one embodiment, the first and the second forwarding contexts are associated with different logical routers.

One embodiment includes a packet switching device, which comprises: a first forwarding context, a second forwarding context, and a switching mechanism configured to communicate packets among the forwarding contexts. The first forwarding context, associated with a first ingress port and a first egress port for respectively receiving packets and transmitting packets, is configured to identify forwarding information for packets based on a first forwarding information base. The first forwarding context also includes a first U-turn port comprising a particular ingress port and a particular egress port, wherein the packet switching device is configured to automatically forward packets received on the particular egress port to the particular ingress port unless they are dropped from the particular egress port. The second forwarding context, associated with a U-turn port comprising a second ingress port and a second egress port, is configured to identify forwarding information for packets based on a second forwarding information base. The packet switching device is configured such that packets received on the second egress port are automatically forwarded to the second ingress port unless they are dropped from the second egress port. The first forwarding context is configured to forward packets identified to be sent to the second forwarding context based on the first forwarding information base from the first ingress port over the switching mechanism to the second egress port of the U-turn port via the switching mechanism without traversing an ingress port of the second forwarding context. The first forwarding context is also configured to forward packets identified to be sent to the second forwarding context based on the first forwarding information base from the particular ingress port of the first U-turn over the switching mechanism to the second egress port of the U-turn port via the switching mechanism without traversing an ingress port of the second forwarding context.

In one embodiment, the first forwarding context is configured to send packets received on the first ingress port and identified as being associated with a tunnel to the particular egress port of the first U-turn port. In one embodiment, the first and the second forwarding contexts are associated with different virtual routers.

Turning expressly to the figures, FIG. 1A illustrates an example configuration used in one embodiment. Packet switching device 100 includes a line card 110 which includes one or more forwarding contexts (e.g., virtual or logical routers), and a packet switching mechanism (e.g., individual or combinations of switch fabric, crossbar, bus, time-division and/or space-division switching device, etc.). Line card 110 receives packets from external devices into its ingress ports (116) and transmits packets from its egress ports (116) to external devices, such as through one or more shared port adapter cards 102. Line card 110 also includes a U-turn port 118 for receiving packets from other one or multiple forwarding contexts within packet switching device 100. A U-turn port typically comprises an egress port and an ingress port such that packets placed in the egress port are automatically forwarded to the ingress port (that is, if they are not dropped by optional packet processing performed on the packets on the egress port). Other forwarding contexts are able to communicate packets to a next-destination forwarding context by directly sending these packets to the U-turn port of the next-destination forwarding context (e.g., not through an ingress port associated with the next-hop forwarding context). In one embodiment, multiple different forwarding contexts send packets to a particular forwarding context using the same U-turn port associated with the particular forwarding context. In one embodiment, a particular forwarding contexts has multiple U-turn ports associated with it, and at least two different forwarding contexts send packets to the particular forwarding context using different U-turn ports associated with the particular forwarding context. In one embodiment, multiple forwarding contexts can send to a single U-turn port and these multiple forwarding contexts can be given different treatment based on labels identifying one or more forwarding contexts and/or placed in different queues of the U-turn port (e.g., a queue corresponds to one or more forwarding contexts and/or a path from one forwarding context to another).

Line card 110 also includes one or more route processors 111 which identify, inter alia, next-hop forwarding information for packets by performing lookup operations on one or more forwarding information base data structures 112. Each forwarding context supported on line card 110 can have its own forwarding information data structure (112) or a single data structure (112) can be used to maintain multiple forwarding information bases. Line card 110 also includes one or more feature application mechanisms 113 which apply one or more features to packets, typically when a packet is at a port. Examples of such features, include, but are not limited to: access control lists (ACLs), quality of service (QoS) (e.g., committed access rate, rate-limiting, shaping, marking, etc.), aggregated/sampled Netflow accounting, unicast reverse-path forwarding (uRPF), policy-based routing, Border Gateway Protocol (BGP) policy accounting, QoS policy propagation via BGP, accounting, statistics, web cache redirect, lawful Interception, IPSec encryption/decryption, intrusion detection and prevention, state-full firewall, network address translation, and network-based application recognition.

Figure 1B:
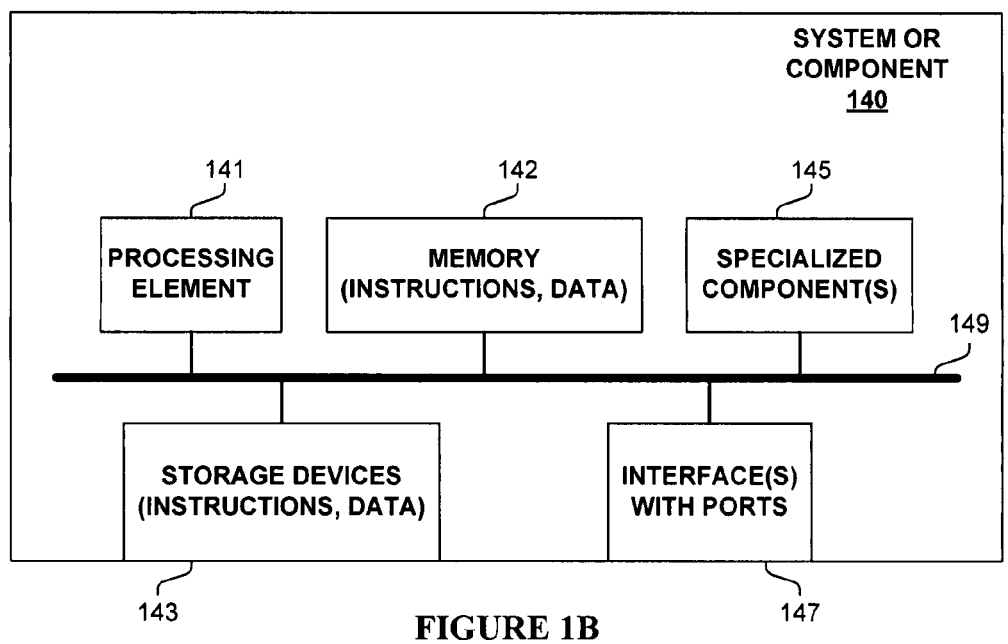
FIG. 1B illustrates an example system or component used in one embodiment.

FIG. 1B illustrates an example system or component used in one embodiment that interconnects forwarding contexts using U-turn ports. In one embodiment, system or component 140 performs one or more processes corresponding to one of the flow diagrams illustrated or otherwise described herein.

In one embodiment, system or component 140 includes a processing element 141, memory 142, storage devices 143, and optionally specialized components 145 (e.g. optimized hardware, etc.) and/or interfaces with ports 147 for sending and receiving packets, which are typically communicatively coupled via one or more communications mechanisms 149, with the communications paths typically tailored to meet the needs of the application. In one embodiment, interfaces with ports 147 includes one or more U-turn ports.

Various embodiments of component 140 may include more or less elements. The operation of component 140 is typically controlled by processing element 141 using memory 142 and storage devices 143 to perform one or more tasks or processes. Memory 142 is one type of computer-readable medium, and typically comprises random access memory (RAM), read only memory (ROM), flash memory, integrated circuits, and/or other memory components. Memory 142 typically stores computer-executable instructions to be executed by processing element 141 and/or data which is manipulated by processing element 141 for implementing functionality in accordance with an embodiment. Storage devices 143 are another type of computer-readable medium, and typically comprise solid state storage media, disk drives, diskettes, networked services, tape drives, and other storage devices. Storage devices 143 typically store computer-executable instructions to be executed by processing element 141 and/or data which is manipulated by processing element 141 for implementing functionality in accordance with an embodiment.

Figure 2:
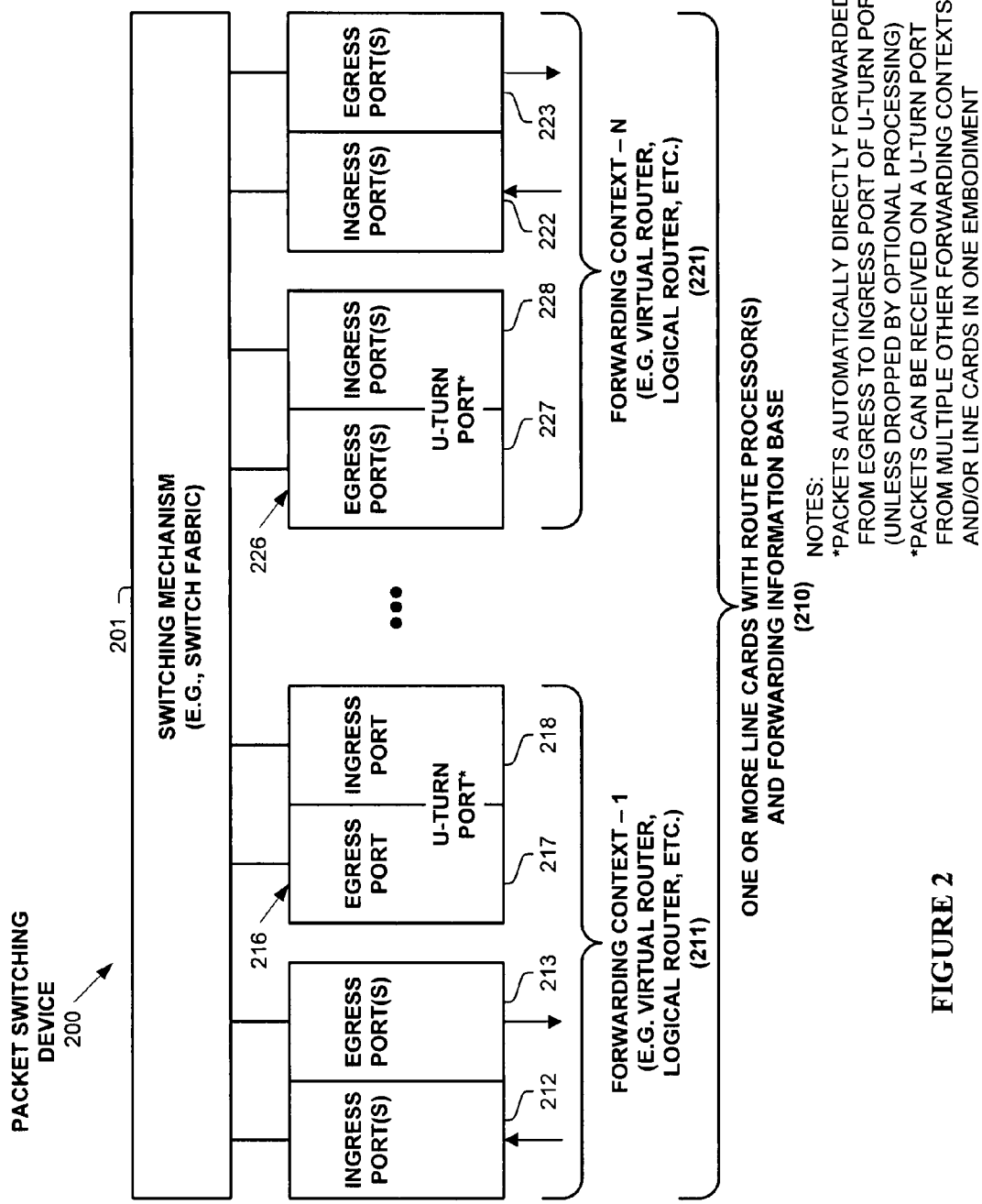
FIG. 2 illustrates an example configuration used in one embodiment.

FIG. 2 illustrates an example configuration used in one embodiment. Packet switching device 200 includes multiple forwarding contexts (211, 221) distributed among one or more line cards 210 connected by switching mechanism 201. In one embodiment, forwarding contexts 211, 221 are on the same line card 210 (e.g., sometimes referred to as a virtual router configuration). In one embodiment, forwarding contexts 211, 221 are on different line cards 210 (e.g., sometimes referred to as a logical router configuration). Ingress ports 212 and 222 are used for receiving packets, typically from external devices. Egress ports 213 and 223 are used for sending packets, typically to external devices. As shown, packet switching device 200 includes two U-turn ports 216 and 226, each respectively including egress port 217 and ingress port 218, and egress port 227 and ingress port 228. U-turn port 216 is configured to automatically directly forward packets received on egress port 217 to ingress port 218. U-turn port 226 is configured to automatically directly forward packets received on egress port 227 to ingress port 228.

In one embodiment, features can be applied on egress port 217 and/or egress port 227, in which case, typically only packets not dropped at the egress port 217, 227 are automatically forwarded. In one embodiment, features can be applied on ingress port 218 and/or ingress port 228. In one embodiment, the set of features to be applied to packets using U-turn port 216 are applied all on egress port 217, all on ingress port 218, or split in some manner between egress port 217 and ingress port 218. In one embodiment, the set of features to be applied to packets using U-turn port 226 are applied all on egress port 227, all on ingress port 228, or split in some manner between egress port 227 and ingress port 228.

In one embodiment, packets can be received on a U-turn port from multiple different forwarding contexts. In one embodiment, packets can be received on a single U-turn port from a single different forwarding context.

Figure 3:
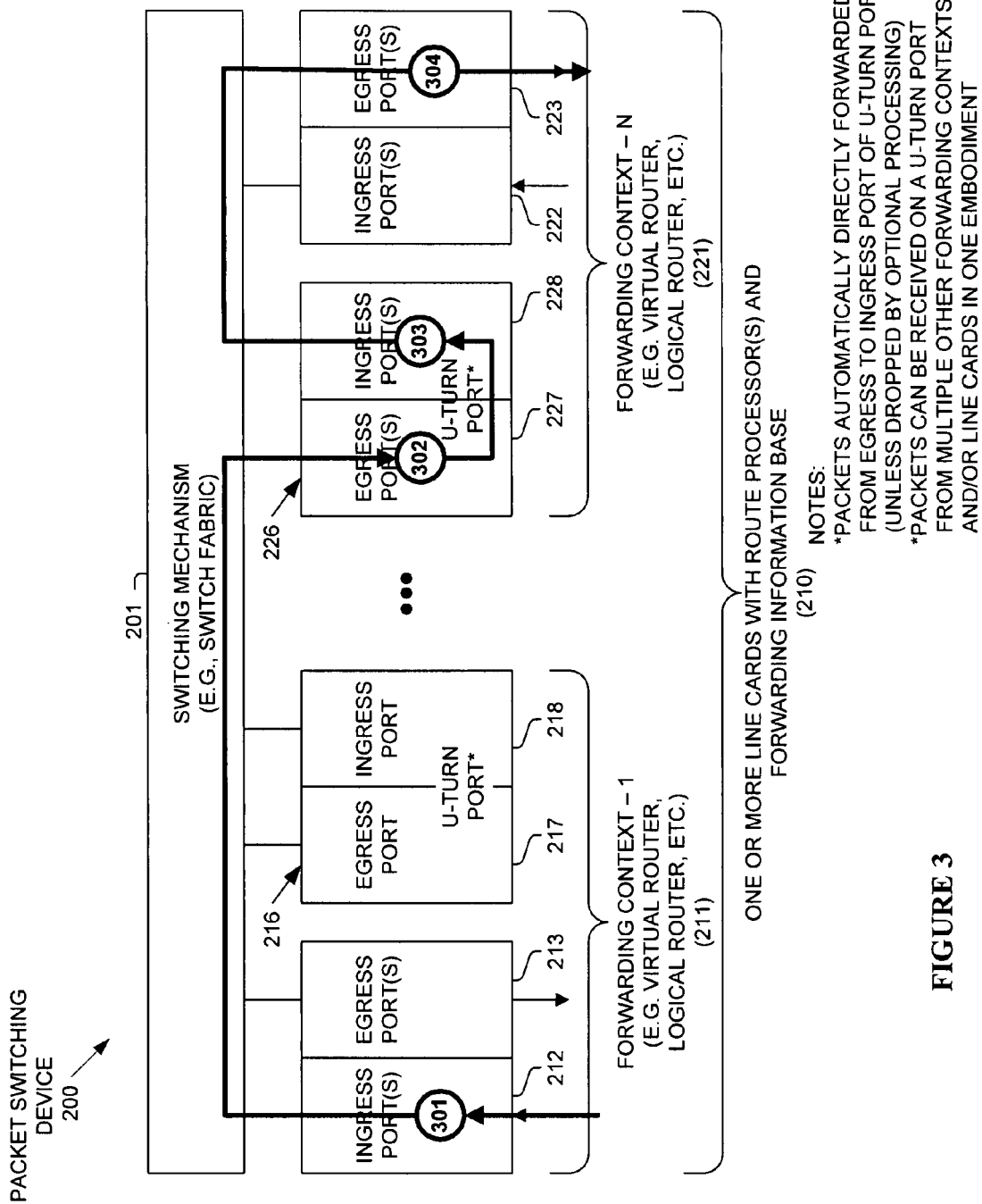
FIG. 3 illustrates an example configuration useful for explaining the operation of one embodiment.

FIG. 3 illustrates the operation of one embodiment of packet switching device 200 (FIG. 2). As denoted by 301, a packet is received on ingress port 212, and a lookup operation is performed on the forwarding information base of forwarding context-1 (211) to identify that the packet should be forwarded to forwarding context-N (221) of a same or different line card. As denoted by 302, the packet is received directly via switching mechanism 201 on the egress port 227 of U-turn port 226 of forwarding context-N (221) (with optional packet processing performed—such as a feature being applied). As denoted by 303, the packet is automatically forwarded to ingress port 228 of U-turn port 226, typically such that it appears as if it was received on a physical interface and placed in an ingress port. The packet is processed according to the configuration of forwarding context-N (221). In this example, this processing includes a lookup operation being performed on the forwarding information base of forwarding context-N (221), and based on which, the packet is forwarded to egress port 223, processed and forwarded to an external device as denoted by 304.

Figure 4:
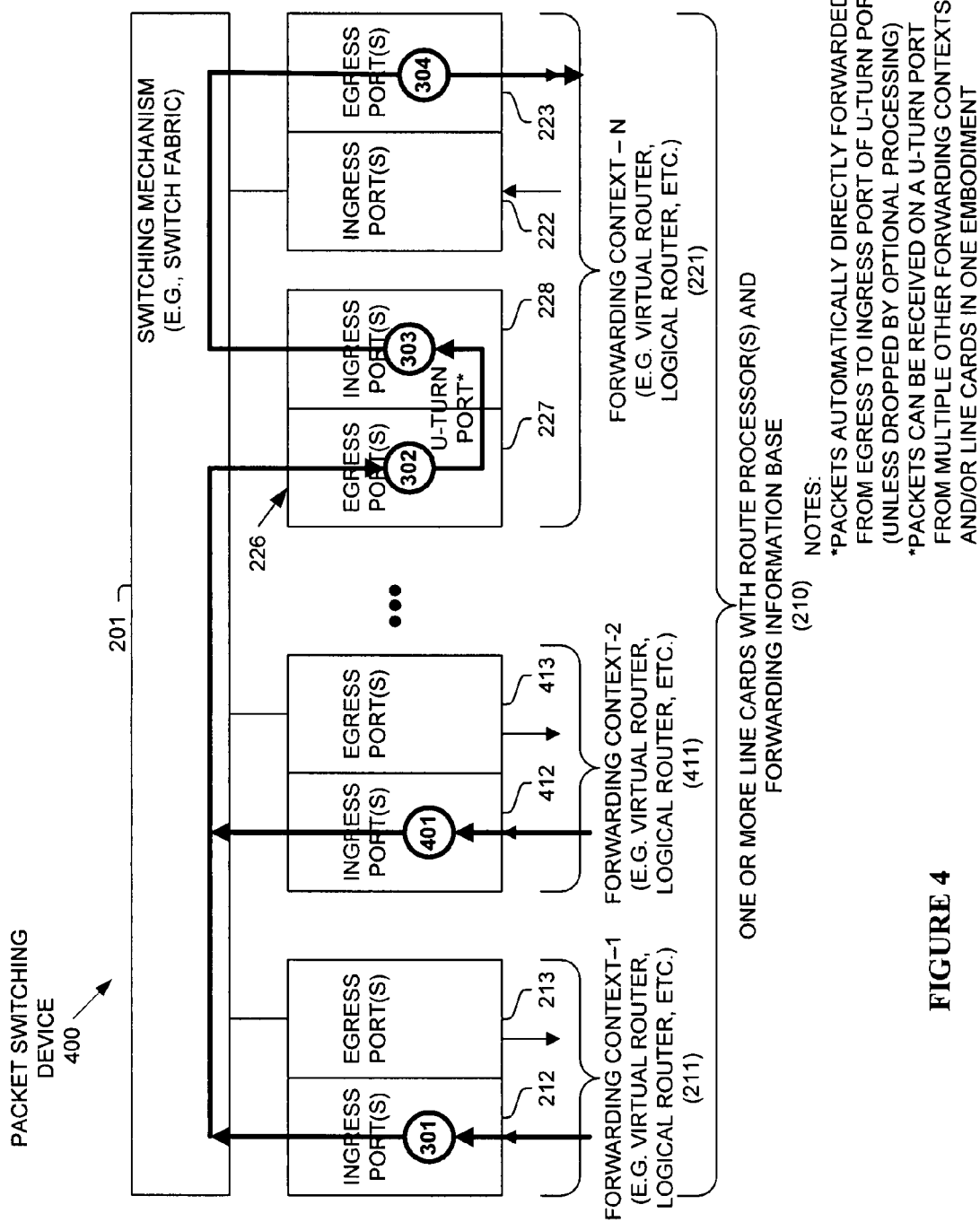
FIG. 4 illustrates an example configuration useful for explaining the operation of one embodiment.

FIG. 4 illustrates the operation of one embodiment of packet switching device 400 (similar packet switching devices illustrated in FIGS. 2 and 3), but FIG. 4 explicitly illustrates that a single U-turn port 226 of a forwarding context (221) can receive packets from multiple forwarding contexts (211, 411) as denoted by 301 and 401. One embodiment differentiates its processing of packets (e.g., queuing, policing, feature processing, etc.) on U-turn port 226 based on identifying information associated with the packet (e.g., any type of encapsulation of the packet, a packet's label, buffer header, etc.).

Figure 5:
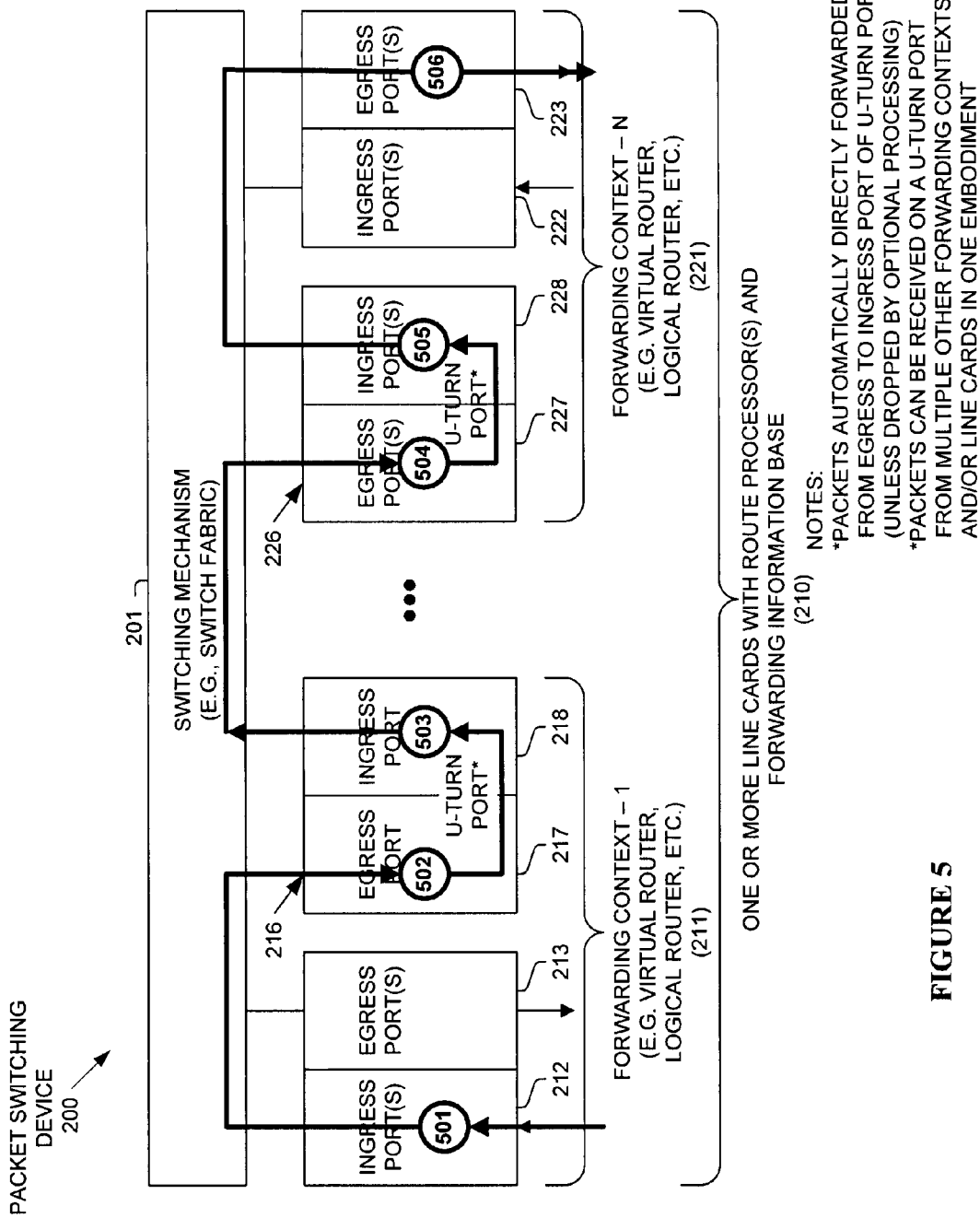
FIG. 5 illustrates an example configuration useful for explaining the operation of one embodiment.

FIG. 5 illustrates the operation of one embodiment of packet switching device 200 (FIG. 2). As denoted by 501, a packet is received on ingress port 212, and a lookup operation is performed on the forwarding information base of forwarding context-1 (211) to identify that egress processing of the packet by forwarding context-1 (211) is desired. Such egress processing may include, but is not limited to: tunnel encapsulation, statistics, shaping, policing, feature processing (e.g., ACLs, statistics, etc.).

As denoted by 502, the packet is received via switching mechanism 201 on the egress port 217 of U-turn port 216 of the same forwarding context (211). As denoted by 502-503, the packet is automatically directly forwarded (possibly after some packet processing) to ingress port 218 of U-turn port 216, and is received on ingress port 218, and a lookup operation is performed on the forwarding information base of forwarding context-1 (211) to identify that the packet should be forwarded to forwarding context-N (221) of a same or different line card. As denoted by 504, the packet is received directly via switching mechanism 201 on the egress port 227 of U-turn port 226 of forwarding context-N (221) (with optional packet processing performed—such as a feature being applied). As denoted by 504-505, the packet is automatically forwarded to ingress port 228 of U-turn port 226, typically such that it appears as if it was received on a physical interface and placed in an ingress port. The packet is processed according to the configuration of forwarding context-N (221). In this example, this processing includes a lookup operation being performed on the forwarding information base of forwarding context-N (221), and based on which, the packet is forwarded to egress port 223, processed and forwarded to an external device as denoted by 506.

Figure 6A:
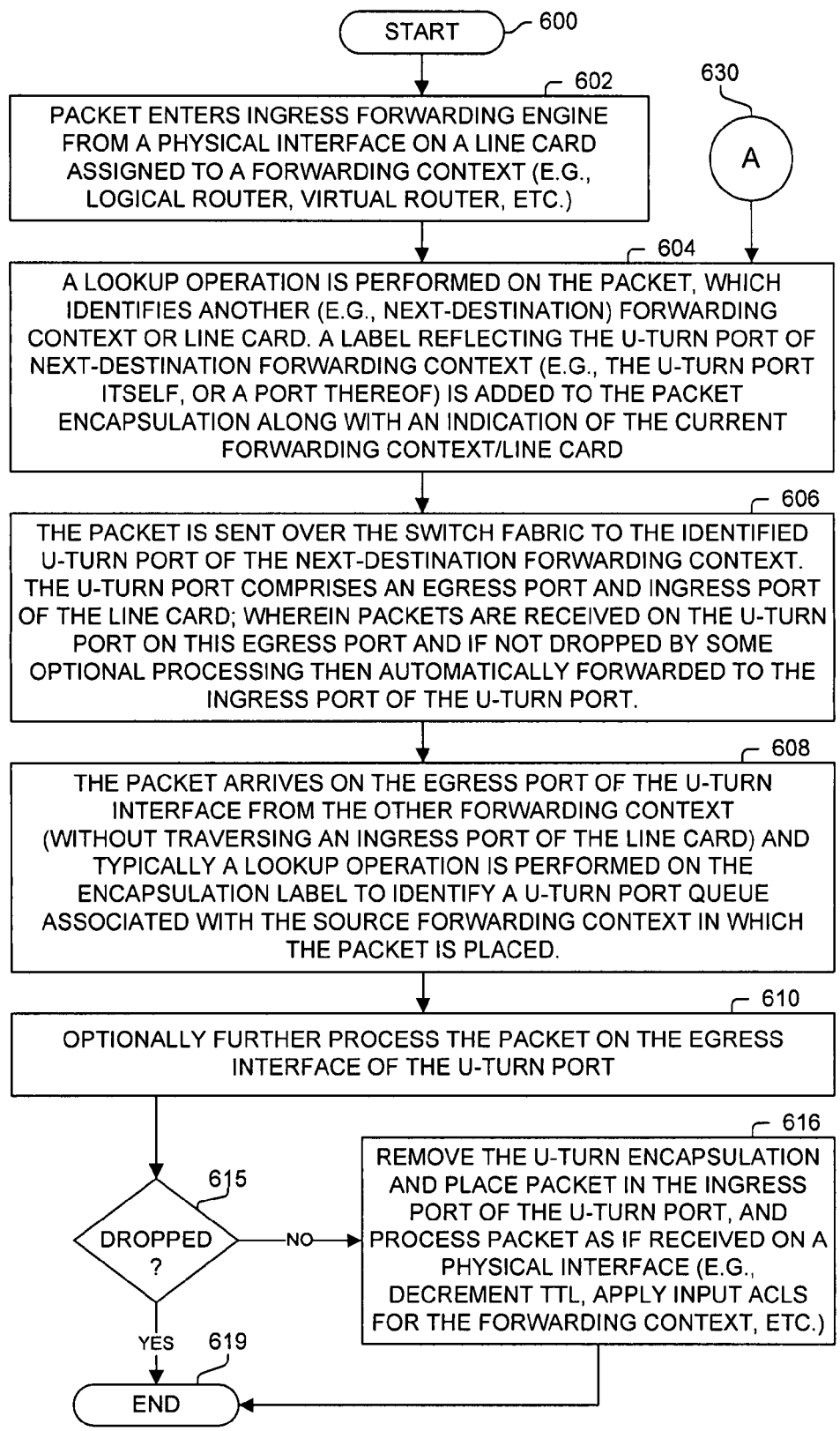
FIG. 6A illustrates an example process useful for explaining the operation of one embodiment.

FIG. 6A illustrates a process used in one embodiment. Processing begins with process block 600, and proceeds to process block 602, wherein the packet enters ingress forwarding engine from a physical interface on a line card assigned to a forwarding context (e.g., logical router, virtual router, etc.). In process block 604, a lookup operation is performed on the packet (e.g., using its destination address/label and/or other classification and/or fields of the packet), which identifies another (e.g., next-destination) forwarding context or line card. A label reflecting the U-turn port of next-destination forwarding context (e.g., the U-turn port itself, or a port thereof) is added to the packet encapsulation along with an indication of the current forwarding context/line card. In process block 606, the packet is sent over the switch fabric to the identified U-turn port of the next-destination forwarding context. The U-turn port comprises an egress port and ingress port of the line card; wherein packets are received on the U-turn port on this egress port and, if not dropped by some optional processing, then the packet is automatically forwarded to the ingress port of the U-turn port. In process block 608, the packet arrives on the egress port of the U-turn interface from the other forwarding context (without traversing an ingress port of the line card), and typically, a lookup operation is performed on the encapsulation label to identify a U-turn port queue associated with the source forwarding context in which the packet is placed. In process block 610, optionally, further processing is performed on the packet on the egress interface of the U-turn port. As determined by process block 615, if the optional processing did not cause the packet to be dropped at the egress port of the U-turn port, then, in process block 616, the U-turn encapsulation is removed, and the packet is placed in the ingress port of the U-turn port, and the packet is processed as if received on a physical interface (e.g., decrement TTL, apply input ACLs for the forwarding context, etc.). Processing is complete as indicated by process block 619.

Figure 6B:
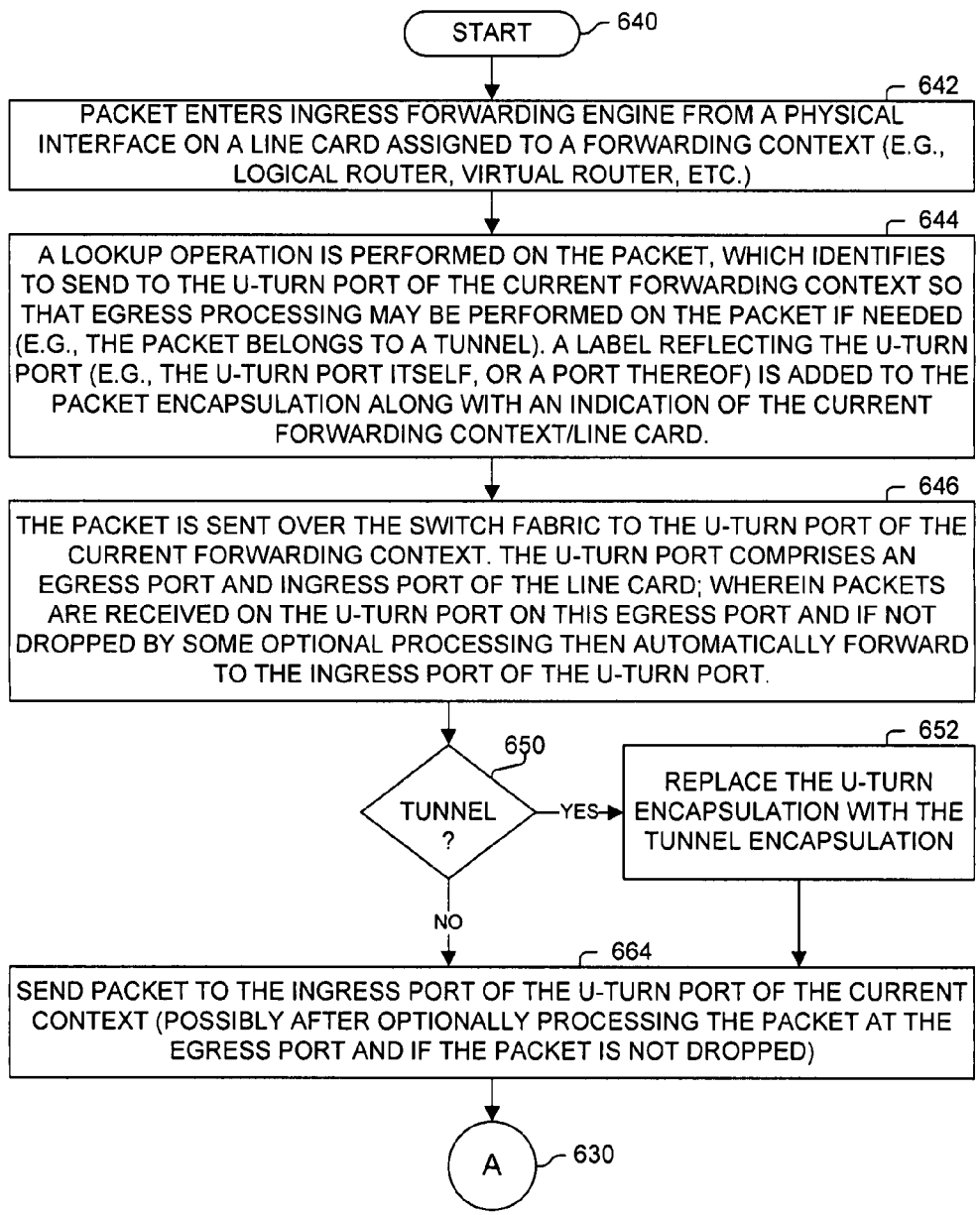
FIG. 6B illustrates an example process useful for explaining the operation of one embodiment.

FIG. 6B illustrates a process used in one embodiment. Processing begins with process block 640, and proceeds to process block 642, wherein a packet on an ingress port of a packet switch enters the ingress forwarding engine from a physical interface on a line card assigned to a forwarding context (e.g., logical router, virtual router, etc.). In process block 644, a lookup operation is performed on the packet, which identifies to send the U-turn port of the current forwarding context (e.g., egress processing of the packet is possibly desired). A label reflecting the U-turn port (e.g., the U-turn port itself, or a port thereof) is added to the packet encapsulation along with an indication of the current forwarding context/line card. In process block 646, the packet is sent over the switch fabric to the U-turn port of the current forwarding context. The U-turn port comprises an egress port and ingress port of the line card; wherein packets are received on the U-turn port on this egress port and if not dropped by some optional processing then automatically forwarded to the ingress port of the U-turn port. As determined in process block 650, if the packet belongs to a tunnel, then in process block 652, the U-turn encapsulation is replaced with the appropriate tunnel encapsulation. In process block 664, the packet is sent to the ingress port of the U-turn port of the current context (possibly after optionally processing the packet at the egress port and if the packet is not dropped). Processing proceeds to process block 604 of FIG. 6A as denoted by process block 630 (connector A).

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A packet switching device comprising:
   a switching mechanism;
   a first line card associated with a first forwarding context configured to identify forwarding information for packets based on a first forwarding information base stored on the first line card, the first line card including a first ingress port and a first egress port; and
   a second line card associated with a second forwarding context configured to identify forwarding information for packets based on a second forwarding information base stored on the second line card, the second line card including within the second forwarding context a U-turn port comprising a second ingress port and a second egress port; wherein the packet switching device is configured to automatically forward all packets, received on the second egress port from the switching mechanism and not dropped at the second egress port, to the second ingress port from the second egress port;
   wherein the switching mechanism is configured to communicate packets among a plurality of line cards of the packet switching device, the plurality of line cards including the first line card and the second line card; and
   wherein the first line card is configured to forward packets, identified to be sent to the second forwarding context or the second line card based on the first forwarding information base, from the first ingress port over the switching mechanism to the second egress port of the U-turn port via the switching mechanism without traversing an ingress port of the second line card.

2. The packet switching device of claim 1, including: a third line card associated with a third forwarding context configured to identify forwarding information for packets based on a third forwarding information base stored on the third line card, the third line card including a third ingress port and a third egress port; wherein the plurality of line cards includes the third line card; and wherein the third line card is configured to forward packets identified, based on the third forwarding information base, to be sent to the second forwarding context or the second line card from the third ingress port over the switching mechanism to the second egress port of the U-turn port via the switching mechanism without traversing an ingress port of the second line card.

3. The packet switching device of claim 2, wherein all packets (a) forwarded from the first forwarding context on the first line card to the second forwarding context on the second line card, and (b) from the third forwarding context on the third line card to the second forwarding context on the second line card, are forwarded through the U-turn port.

4. The packet switching device of claim 2, wherein the first, the second, and the third forwarding contexts are associated with different logical routers.

5. The packet switching device of claim 2, wherein the second line card is configured to process said packets received on the U-turn port according to the configuration of the second forwarding context.

6. The packet switching device of claim 1, wherein all packets forwarded from the first forwarding context on the first line card to the second forwarding context on the second line card are forwarded through the U-turn port.

7. The packet switching device of claim 1, wherein the first line card includes a third forwarding context configured to identify forwarding information for packets based on a third forwarding information base stored on the first line card, the first line card including a third ingress port and a third egress port; wherein the first line card is configured to forward packets identified, based on the third forwarding information base, to be sent to the second forwarding context or the second line card from the third ingress port over the switching mechanism to the second egress port of the U-turn port via the switching mechanism without traversing an ingress port of the second line card.

8. The packet switching device of claim 7, wherein all packets forwarded from the first and the third forwarding contexts on the first line card to the second forwarding context on the second line card are forwarded through the U-turn port.

9. The packet switching device of claim 7, wherein the second line card is configured to process said packets received on the U-turn port according to the configuration of the second forwarding context.

10. The packet switching device of claim 1, wherein the second line card is configured to process said packets received on the U-turn port according to the configuration of the second forwarding context.

11. The packet switching device of claim 1, wherein the first and the second forwarding contexts are associated with different virtual routers.

12. The packet switching device of claim 1, wherein the first and the second forwarding contexts are associated with different logical routers.

13. The packet switching device of claim 1, wherein the second egress port is configured such that no packets are dropped by the second egress port.

14. The packet switching device of claim 1, wherein the second ingress port is communicatively coupled to the switching mechanism for communicating packets over the switching mechanism.

15. A method, comprising:
   performing operations by a packet switching device, including a switching mechanism; packet forwarding hardware operating a plurality of forwarding contexts on one or more line cards, including a first forwarding context and a second forwarding context; and memory associated with the first forwarding context configured to store a first forwarding information base and memory associated with the second forwarding context configured to store a second forwarding information base; wherein the first forwarding context is associated with a first ingress port and a first egress port for respectively receiving packets and transmitting packets; wherein the second forwarding context is associated with a U-turn port comprising a second ingress port and a second egress port within the second forwarding context; and wherein said operations include:
      identifying forwarding information for packets associated with the first forwarding context based on the first forwarding information base:
      identifying forwarding information for packets associated with the second forwarding context based on the second forwarding information base;

automatically forwarding all packets, that are received on the second egress port from the switching mechanism and not dropped at the second egress port, to the second ingress port from the second egress port;

communicating packets by the switching mechanism among the plurality of forwarding contexts; and forwarding packets, identified in the first forwarding context based on the first forwarding information base to be sent to the second forwarding context, from the first ingress port over the switching mechanism to the second egress port of the U-turn port without traversing an ingress port of the second forwarding context.

16. The method of claim 15, wherein all packets forwarded from the first forwarding context to the second forwarding context are forwarded through the U-turn port.

17. The method of claim 15, wherein the first and the second forwarding contexts are associated with different virtual routers.

18. The method of claim 15, wherein the first and the second forwarding contexts are associated with different logical routers.

19. The packet switching device of claim 15, wherein the second ingress port is communicatively coupled to the switching mechanism for communicating packets over the switching mechanism.

20. A packet switching device comprising:

a switching mechanism; and one or more line cards configured to forward packets according to a first forwarding context configured to identify forwarding information for packets based on a first forwarding information base, the first forwarding context being associated with a first ingress port and a first egress port for respectively receiving packets and transmitting packets, the first forwarding context including a first U-turn port comprising a particular ingress port and a particular egress port within the first forwarding context; wherein the packet switching device is configured to automatically forward all packets, that are received on the particular egress port from the switching mechanism and not dropped at the particular egress port, to the particular ingress port from the particular egress port; and wherein said one or more line cards configured to forward packets according to a second forwarding context configured to identify forwarding information for packets based on a second forwarding information base, the second forwarding context being associated with a second U-turn port comprising a second ingress port and a second egress port within the second forwarding context; wherein the packet switching device is configured to automatically forward all packets, that are received on the second egress port from the switching mechanism and not dropped at the second egress port, to the second ingress port from the second egress port;

wherein the switching mechanism is configured to communicate packets among a plurality of forwarding contexts of said one or more line cards, with the plurality of forwarding contexts including the first and the second forwarding contexts;

wherein the first forwarding context is configured to forward packets identified, based on the first forwarding information base, to be sent to the second forwarding context from the particular ingress port of the first U-turn over the switching mechanism to the second egress port of the second U-turn port via the switching mechanism without traversing an ingress port of the second forwarding context.

21. The packet switching device of claim 20, wherein the first forwarding context is configured to send packets received on the first ingress port and identified as being associated with a tunnel to the particular egress port of the first U-turn port.

22. The packet switching device of claim 20, wherein the first forwarding context and the second forwarding context are associated with different virtual routers.

23. The packet switching device of claim 20, wherein each of the first ingress port and second ingress port is communicatively coupled to the switching mechanism for communicating packets over the switching mechanism.

* * * * *

UNITED STATES PATENT AND TRADEMARK OFFICE
CERTIFICATE OF CORRECTION

PATENT NO.         : 8,340,090 B1
APPLICATION NO.    : 11/715759
DATED              : December 25, 2012
INVENTOR(S)        : Bettink et al.

It is certified that error appears in the above-identified patent and that said Letters Patent is hereby corrected as shown below:

In the Claims

Col. 15, Claim 19, line 23, replace "The packet switching device of claim 15,"
    with -- The method of claim 15, --

Signed and Sealed this
Fifteenth Day of October, 2013

Teresa Stanek Rea
*Deputy Director of the United States Patent and Trademark Office*